US005713312A

United States Patent [19]
Waryasz

[11] Patent Number: 5,713,312
[45] Date of Patent: Feb. 3, 1998

[54] SYNGAS COOLER WITH VERTICAL SURFACE SUPERHEATER

[75] Inventor: Richard E. Waryasz, Longmeadow, Mass.

[73] Assignee: Combustion Engineering, Inc., Windsor, Conn.

[21] Appl. No.: 411,095

[22] Filed: Mar. 27, 1995

[51] Int. Cl.[6] ........................................ F22G 7/08
[52] U.S. Cl. ........................ 122/481; 122/511; 110/234
[58] Field of Search ............................ 122/510, 511, 122/481; 110/234

[56] References Cited

U.S. PATENT DOCUMENTS 5,012,767  5/1991  Sheikh et al. ........................ 122/511

Primary Examiner—Henry A. Bennett
Assistant Examiner—Susanne C. Tinker
Attorney, Agent, or Firm—Robert S. Smith, Esq.

[57] ABSTRACT

A syngas cooler apparatus includes an elongated generally cylindrical pressure vessel having an axial extremity that is a top end during normal operation of the cooler and an axial extremity that is a bottom end during normal operation of the cooler. A laterally extending support member extends within the pressure vessel proximate to the top end and front, back, and two side walls define at least one flow channel in the pressure vessel. The pressure vessel has an inlet and an outlet communicating with the flow channel. A pendant heat exchanger surface comprising a plurality of loops is disposed in the flow channel. Each of the loops is formed from tubing and the major portion of the entire axial extent of the tubing are rectilinear axial sections that are disposed with the axes thereof substantially in a vertical plan during normal operation. The pendant is disposed in the flow channel intermediate the inlet and the outlet and is supported solely from the laterally extending support member.

14 Claims, 5 Drawing Sheets

SYNGAS COOLER WITH VERTICAL SURFACE SUPERHEATER

BACKGROUND OF THE INVENTION

The invention relates to heat exchanger apparatus and particularly to apparatus for cooling syngas, also known as "synthesis gas", produced by a pressurized gasifier. A common application for gasifiers is gasification of fuels. The descriptions in U.S. Pat. Nos. 4,563,194 and 4,398,504, issued respectively to James J. Simon and Andrew F. Kwasnik and assigned to the same assignor as the present invention, will provide general background as to the field of the present invention.

One application for syngas coolers is in a so-called integrated coal gasification combined cycle systems. Conventional approaches to cooling of syngas, as it leaves the gasifier, include a traditional cooler having a single down or up flow gas pass with a plurality of horizontal convective surfaces disposed in that path. Horizontal convective surfaces in a pressurized syngas cooler application become quickly fouled with soot and thus require frequent sootblowing. This is unsatisfactory because the efficiency of the system is often limited by losses due to soot accumulation and the energy consumption required for sootblowing.

As last some of the prior art syngas cooler apparatus have too many bends in the internal structure and have a structure that is too complex and thus too expensive to manufacture. In addition, some prior art apparatus support much of the internal structure of the cooler on the side walls of the syngas cooler and have inlet and outlet headers fastened to the sidewalls. When the headers are fastened to the sidewalls, additional space is required between the pressure vessel and the waterwalls. Thus, such arrangements are wasteful of the available volume within the outer shell.

Because the syngas is at a very high pressure the cooling process must take place in a very expensive pressure vessel. Because the cost of the pressure vessel is so high it is of great importance to utilize efficiently the volume inside the pressure vessel. The pressure vessel is very heavy and has relatively small openings in the walls thereof. This imposes constraints on the construction to ensure that maintenance can be performed and retrofit of certain components may be accomplished.

It is an object of the invention to provide apparatus that will eliminate soot buildup and thus will operate at a higher efficiency.

Another object of the invention is to provide apparatus that will have lower operating costs than prior art apparatus because the apparatus will require no sootblowing or a minimum amount of sootblowing.

Still another object of the invention is to provide apparatus that will facilitate retrofit of the apparatus in accordance with the invention with additional heat exchange surfaces at the customer's site.

Yet another object of the invention is to provide apparatus that allows such retrofit without requiring any relocation of any of the inlet or outlet links or headers.

Another object of the invention is to optimize the usage of a given diameter cylindrical pressure vessel.

Still another object of the invention is to provide apparatus that will have a minimum pressure drop and more specifically will have a minimum number of tube bends and maximum part of the axial extent of the tubing used in the heat exchange surface will be lengths of straight tubing.

SUMMARY OF THE INVENTION

It has now been found, that these and other objects of the invention may be obtained in a syngas cooler apparatus which includes an elongated generally cylindrical pressure vessel, the pressure vessel having an axial extremity that is a top end during normal operation of the cooler and an axial extremity that is a bottom end during normal operation of the cooler. A laterally extending support member extends within the pressure vessel proximate to the top end and front, back, and two side walls define at least one flow channel in the pressure vessel. The pressure vessel has an inlet and an outlet communicating with the flow channel. A pendant heat exchanger surface comprising a plurality of loops is disposed in the flow channel. Each of the loops is formed from tubing and the major portion of the entire axial extent of the tubing are rectilinear axial sections that are disposed with the axes thereof substantially in a vertical plane during normal operation. The pendant is disposed in the flow channel intermediate the inlet and the outlet and is supported solely from the laterally extending support member.

In some forms of the invention the cooler includes a header at the top thereof. A division wall may separate the flow channel into first and second portions and the direction of fluid flow in the first portion may be opposite to the direction of fluid flow in the second portion. The direction of fluid flow in the first portion may be downward. In some embodiments the pendant heat exchange surface comprises a plurality of tubes and the plurality of tubes each include first and second U-shaped bends defining first and second cavities.

Some embodiments of the invention are constructed with a pressure vessel that has generally spherical ends and the pendant heat exchanger surface includes headers and links and the headers and links are disposed substantially within one of the generally spherical ends.

The front, back, and two side walls may be membrane walls and a second heat exchanger may be disposed in the flow path.

BRIEF DESCRIPTION OF THE DRAWING

The invention will be better under understood by reference to the accompanying drawing in which.

DESCRIPTION OF THE PREFERRED EMBODIMENTS

Figure 1:
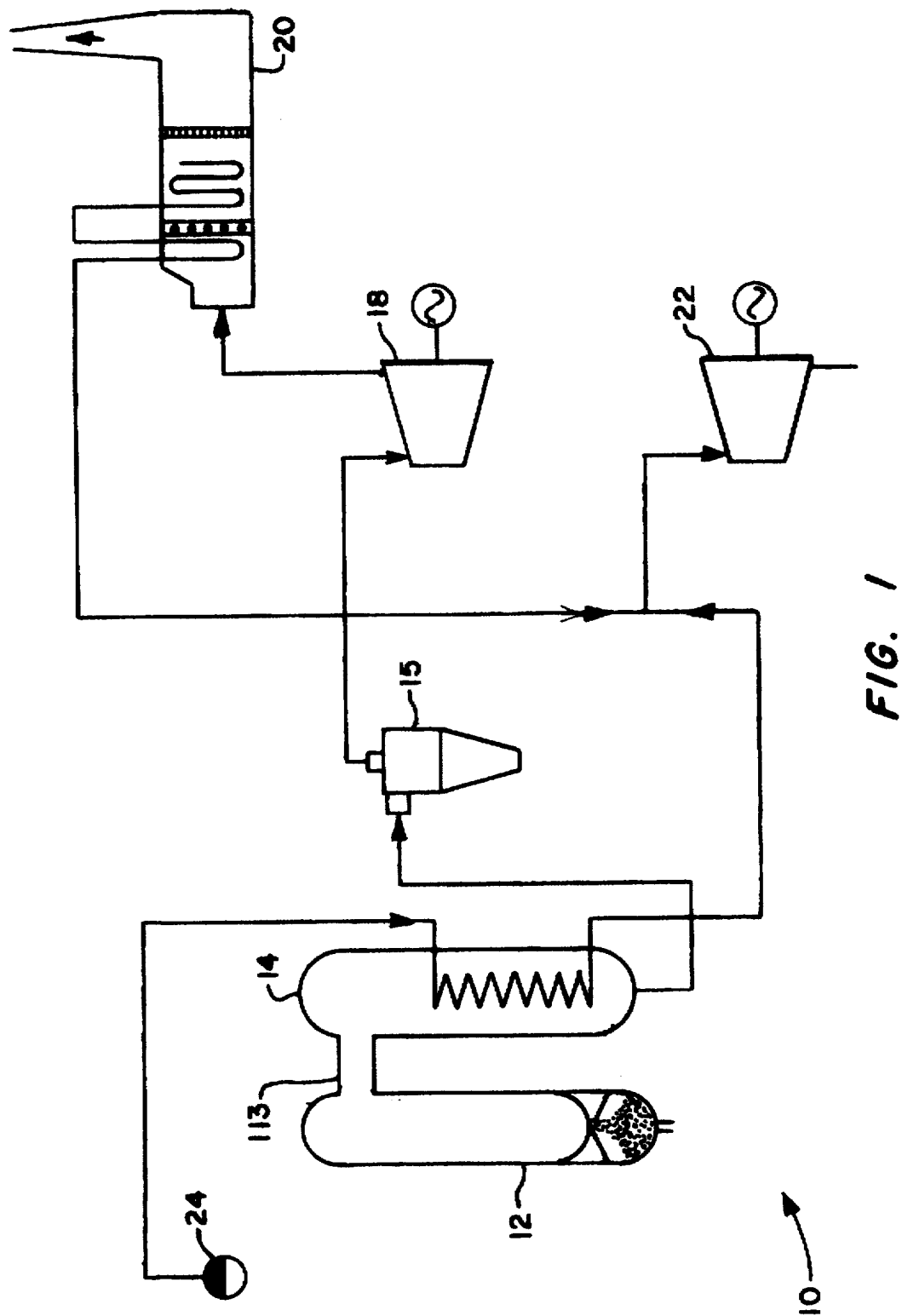
FIG. 1 is a greatly simplified schematic view of an integrated coal gasification combined cycle system which is one type of system in which the syngas cooler in accordance with the present invention may be used.

Referring now to FIG. 1 there is shown integrated coal gasification combined cycle system 10. Such systems, in some forms, couple a gasifier 12 with a syngas cooler 14. The gasifier 12 heats coal with steam to produce the syngas. The gasifier 12 illustrated in FIG. 1, of the present application is a vertically elongated pressure vessel. Pressurized pulverized coal is fed to both the middle and bottom of the gasifier 12. The gasifier has a combustion section at the bottom thereof and a reduction section at the middle thereof. A slag tap at the bottom of the combustion section allows removal of slag.

The syngas cooler 14 cools the syngas with high pressure steam that during normal operation is superheated in the syngas cooler 14. The syngas is directed to a cyclone 15 and then burned in gas turbine portion of a gas turbine generator 18.

The typical system will also include a gas turbine generator 18. This apparatus includes a generator coupled to the shaft of a gas turbine. The hot exhaust gases from the gas turbine are directed to a heat recovery steam generator 20.

The heat recovery steam generator 20 increases the thermal efficiency of the gas turbine generator 18 by utilizing the high exit gas temperatures and extremely high excess air percentages of the gas turbine generator 18. The boiler of the heat recovery steam generator 20 may be fired with natural gas to boost electrical output to compensate for reduction in output of the when the system is operated at high ambient temperatures. In addition, when the gasifier 12 is not operating, the combined cycle can produce full rated load by providing natural gas firing of the heat recovery steam generator 20 and the gas turbine of the gas turbine generator 18.

During operation of the gasifier 12 on coal, high pressure steam is generated and superheated in both the syngas cooler 14 and the heat recovery steam generator 20. In a typical system the two fluid streams are combined and fed into the steam generator of a steam turbine generator 22.

The focus of the present invention is the syngas cooler 14. In the preferred embodiment of the invention the syngas cooler 14 is elongated in a vertical direction and has heat exchange surfaces that are generally vertically disposed with generally vertical gas passes. Pendant type surfaces for heat exchange are provided.

The high pressure feedwater exiting from the steam turbine section of the steam turbine generator 22 is used to cool the walls of the gasifier 12 and the walls of the syngas cooler 14 and the walls and heat exchange surfaces within the syngas cooler. More specifically, the high pressure feedwater is evaporated in the walls of the gasifier 12 and heat exchange surfaces in the syngas cooler 14. The steam and water mixture produced from these heat exchange surfaces is separated in a steam drum 24. The water is returned to the various waterwalls and the steam is delivered to superheater 112 located in the syngas cooler 14.

The cooling media is high pressure steam and water supplied from a steam drum 24. This media is circulated throughout the Integrated Gasification Combined Cycle (IGCC) plant manufactured by the assignee of the present application. Because of the high pressure, the gasifier 12, the crossover pressure vessel 113, and the syngas cooler 14 are pressure vessels. Because of the high temperatures in these pressure vessels the walls of each of the pressure vessels are lined with membrane walls. Each membrane wall is formed by a plurality of mutually parallel tubular members in which each tubular member is joined on opposed sides thereof by respective plates to adjacent tubular members. A steam and water mixture flows through the tubular members or tubes.

Figure 2:
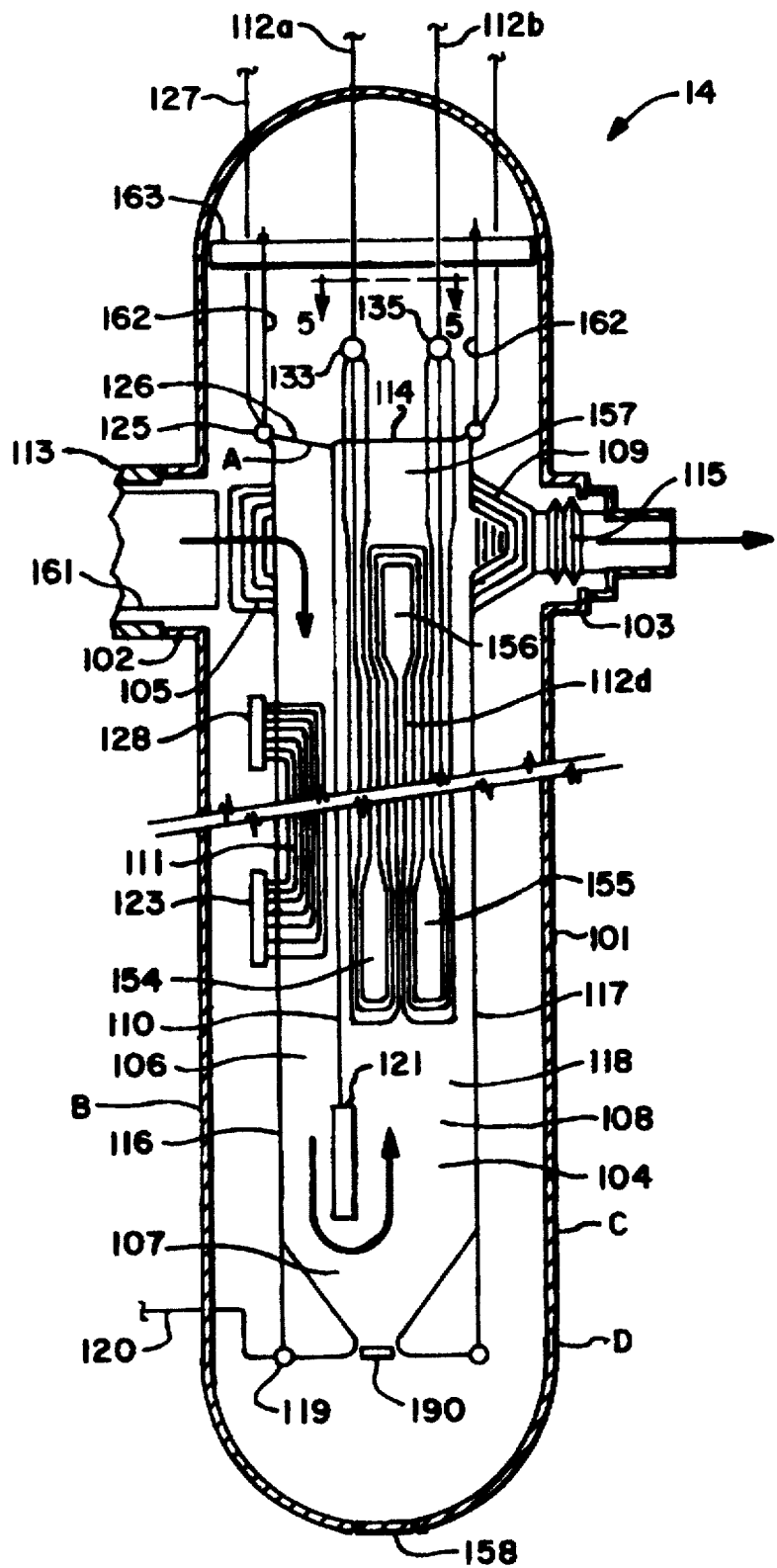
FIG. 2 is a partly schematic sectional view, taken along a vertical plane, which illustrates a two pass embodiment of the apparatus in accordance with the present invention.
Figure 5:
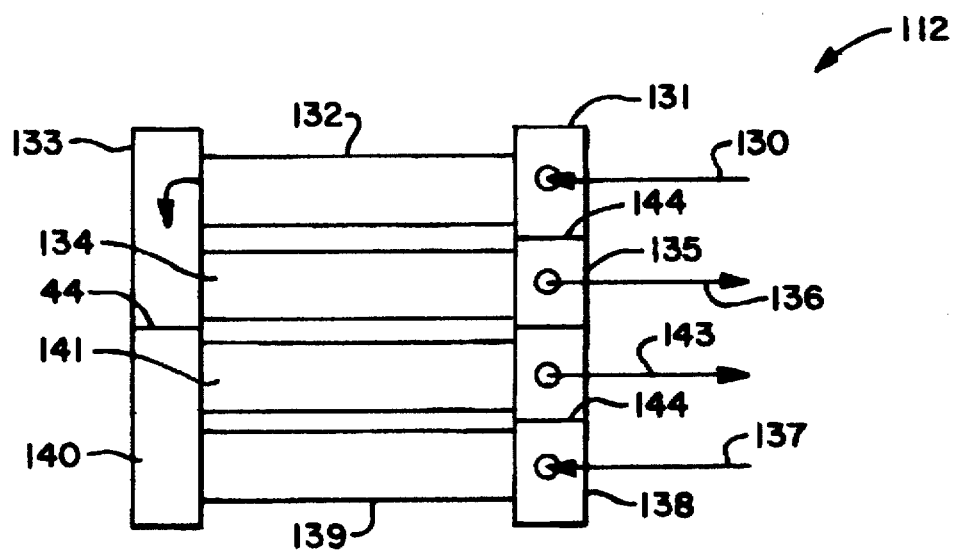
FIG. 5 is a partial sectional schematic view taken along the line 5—5 of FIG. 2 which illustrates the arrangement of superheater headers, links and pendants.

Referring particularly now to FIGS. 2 and 5, the cooler 14 in accordance with a preferred form of the invention is elongated vertically and contains vertical gas passes in which pendant type surfaces for heat exchange are provided. The housing or pressure vessel 101 is designed to hold the operating pressure of the system. The housing 101 is elongated and the axis thereof is generally vertically disposed.

The vessel 101 is provided with an inlet nozzle or rifling 102 and an outlet nozzle or fitting 103. The fittings 102, 103 have concentric water cooled inner nozzles or openings 105, 109 for access respectively to the water cooled side walls 116, 117 disposed at the sides of the gas pass or passage 104. The fittings 105, 109 are constructed as a continuation of the water cooled side walls 116, 117 which are a part of the water wall defining the gas pass 104.

This embodiment has a vertical two pass gas pass 104. The gas pass 104 includes an inlet nozzle 105, a downflow channel or duct 106, a return bend 107, an upflow duct or channel 108, and an outlet nozzle 109. The downflow duct 106 and the upflow duct 108 are separated by a division wall 110. Within the downflow duct 106 a heat exchange surface 111 may be provided in some embodiments. It will be further understood that the heat exchange surface 111 may be either installed at the time of initial construction or may be retrofitted at some latter time. The retrofit may be accomplished by insertion of the heat exchange surface through the door 158 located in the pressure vessel 101 and the door 190 in the gas pass 104.

The heat exchange surface 111 is located in the downflow duct 106. This structure may be either installed when the system is originally constructed or retrofitted to existing systems. The surface 111 is characterized by panels that are more widely spaced than the heat exchange surfaces in the upflow duct 108. Each panel is planar and a plurality of these panels, in the preferred embodiment are spaced about eighteen inches apart so that the soot passing through the gas pass will not bridge the gap. The tubes in each panel are spaced about ⅜" apart in the preferred embodiment. The greater spacing in the duct 106 than in the upflow duct 108 is necessary because the entrained soot in the o gases flowing in the downflow duct 106 are hotter and thus inherently more sticky than the gas and entrained soot flowing in the upflow duct 108. The construction of the surface 111 is such that it may installed or modified without extensive removal of water cooled pads of the vessel 101. It is the vessel 101 that must sustain the pressure inside the cooler 14.

Figure 3:
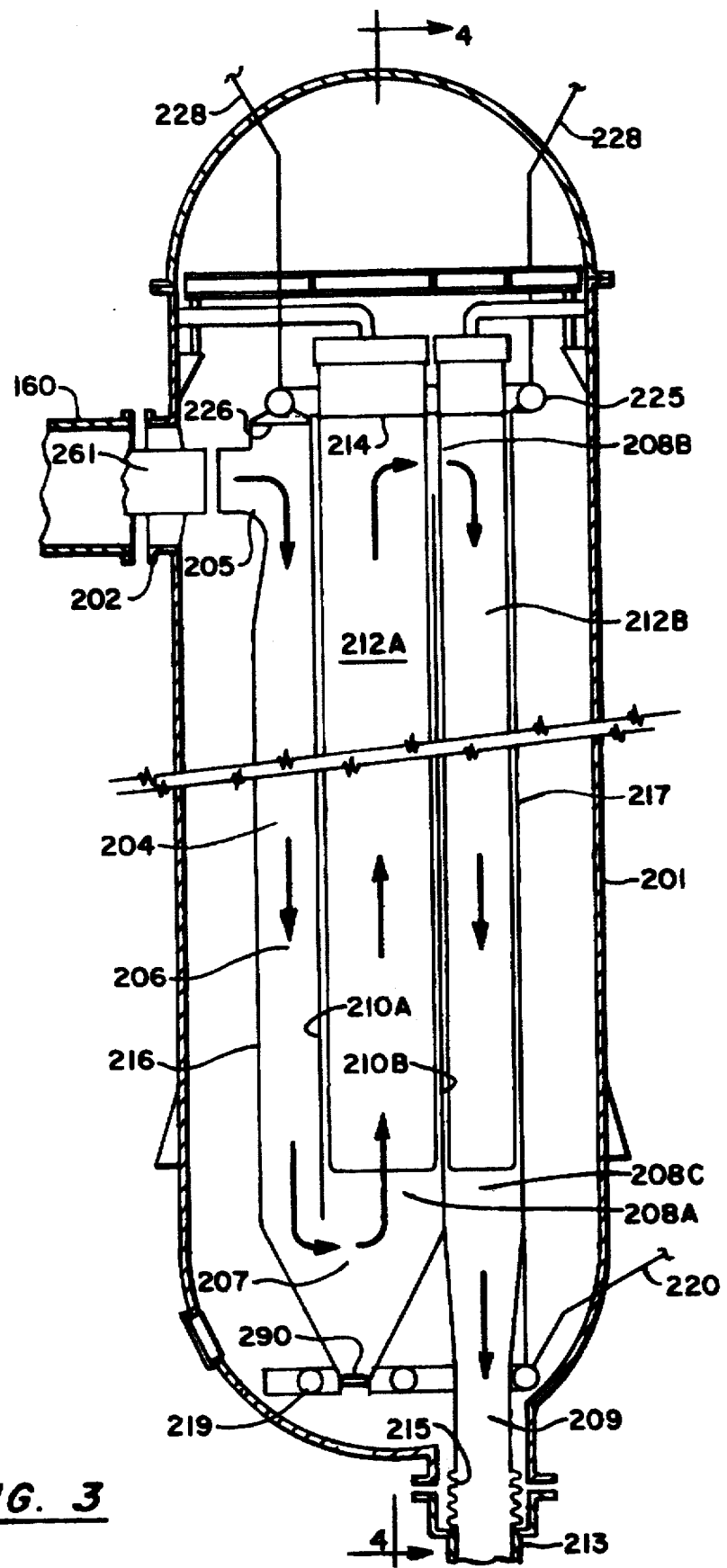
FIG. 3 is a partly schematic sectional view taken long a vertical plane of a three pass embodiment of the apparatus in accordance with the present invention.

Disposed in the upflow duct 108 is a superheater 112. In the embodiment of FIGS. 2 and 3, the pressure vessel nozzle 102 is mated to the crossover pressure vessel 113 and the gas pass inlet 105 of the gas pass 104 is similarly mated to a water cooled gas pass duct 161. Both the crossover pressure vessel 113 and the gas pass duct 161 extend between the gasifier 12 and the cooler 14.

The vertically elongated cooler 14 is connected to the vertically elongated gasifier 12 by a horizontal elongated crossover 113. The cooler 14, gasifier 12, and crossover 113 are pressure vessels. The crossover 113 is ordinarily bolted to the cooler 14 and the gasifier 12. Within these pressure vessels are gas passes defined within water cooled walls known in the art as membrane walls. Because of the water expansion considerations in some applications, the water cooled gas pass duct 161 is, in the preferred embodiment, coupled to the gas pass 104 in the cooler 14 by a gas tight bellows expansion joint (not shown). The crossover gas pass duct 161 is concentric within the crossover pressure vessel 113. The water cooled tubing thereof extends from the gasifier water walls to the water cooled walls of the cooler 14.

At the outlet 109 of the gas pass or passage 104 the gas temperature is low enough so that continuation of the water cooled duct is not required. Therefore, the preferred embodiment includes a junction of the water cooled outlet 109 and the crossover 113. It will be understood that the use of a discrete crossover 113 that is separate from the cooler 14 allows for maintainability. The crossover 113 is generally cylindrical and ordinarily is bolted to the pressure vessel 101 that is the outer shell of the cooler 14.

The water cooled outlet 109 and pressure containment vessel 101 are joined together with a bellows 115. All heat exchange surfaces in the cooler 14 are integrated into the steam cycle of the entire system 10. The bounding walls of the water cooled gas pass 104 are part of the circulation sub-system of the entire system 10. The bounding walls of the gas pass 104 perform an evaporative function and each cooperates with a common steam drum to separate steam and water. Steam from the steam drum 24 is superheated in the superheater 112.

The front wall 116, the rear wall 117, two side walls 118 and the division wall 110, all membrane walls, collectively define the water cooled gas pass 104. It will be understood that the term "membrane wall" in the context of apparatus of this type refers to a plate and fin wall having a plurality of substantially parallel tubes that carry a cooling media. Each tube has a plate welded thereto that is also welded to an adjacent tube. The center-lines of the tubes and the plates are coplanar.

These walls 116, 117, 118, 118 are supplied with boiler circulation water via links from the steam drum 24. More specifically, the front wall 116, side walls 118 and rear wall 117 each receive flow from lower ring header 119 which receives flow via the supply lines 120. The division wall 110 is fed by two headers 121 each located on a side wall and fed by supply lines (omitted from the drawing for simplicity). In the illustrated embodiment of FIGS. 2 and 3 the structure includes an optional surface 111 that is part of the evaporative system and is located in the downflow duct 106.

These heat exchange surfaces 111 are fed by a header 123 and a supply line (omitted for simplicity). All of the walls 116, 117, 118, 118 terminate in an upper ring header 125. Both the front wall 116 and the rear wall 117 form a coutant hopper, rise vertically, and form waterwall openings before exiting to the upper ring header 125. The side walls 118, 118 are substantially vertical. The roof 126 of the downflow duct 106 is formed as a continuation of the division wall 110. The upflow channel roof 114 construction is dependent on the gas temperature and may be uncooled or may be cooled by a continuation of the division wall 110 or by a continuation of the side walls 118. Both roofs 126, 114 are of gas tight construction. The riser tubes 127 route the steam and water mixture form the upper ring header 125 to the steam drum 24. Optional surface panels 111 discharge into an outlet header 128 which is connected to the same steam drum 24 by relief lines which have been omitted for simplicity.

The superheater 112 comprises in the preferred embodiment first, second, third and fourth surface arrays or stages 132, 134, 141, and 139. In the preferred embodiment each of the arrays or stages 132, 134, 141, and 139 includes a plurality of panels or pendants 112d that are each generally planar and each mutually parallel. Each panel or pendant 112d has a tightly spaced tube arrangement which in the preferred embodiment is a double loop with an intermesh of three. Those skilled in the art will understand that each panel or pendant 112d, is a sub-assembly of one of the arrays 132, 134, 141, 139 and that the each of the arrays 132, 134, 141, 139 are sub-assemblies of the superheater 112. Each pendant 112d has the tubes thereof arranged generally in the manner shown in FIG. 2. Those skilled in the art will recognize the term "intermesh of three" refers to the construction shown schematically in FIG. 2 in which three substantially coplanar tubes are connected in parallel to common inlet and outlet headers tubes More specifically, the three tubes in any one panel are each arranged in one or more loops and the respective axes thereof are disposed within a single plane. Those skilled in the art will understand the terms "double loop" refers to the construction shown in FIG. 2 wherein each intermesh has two loops. More specifically, each tube extends downwardly to form the upper left part thereof and then upwardly as part of a first U-shaped bend and then has an inverted U-shaped bend that extends into a second U-shaped bend before returning to a header. As will be described hereafter the loops define the cavities 154, 155. In other words, the cavities 154, 155 are spaces within the respective loops of the double loop array.

Although the preferred embodiment has these characteristics, those skilled in the art will recognize that many combinations of intermesh and looping that may be used. Other embodiments of the invention may have other orientations of the respective subassemblies. Although the illustrated embodiment has each of the pendants of the superheater 112 extending between a front wall and a rear wall, Other embodiments of the invention will have the pendants extending between opposed side walls.

The pendants of the superheater 112 are suspended in the gas pass 104. The number of stages is dependent on the superheater design criteria for the specific application. Although the preferred embodiment illustrated in FIGS. 2 and 5 has four stages, other embodiments may have more or less stages.

The headers 131, 133, 135, 138, 141 of the superheater 112 may be individual or may be single and may use internal division plates for segmentation. The type of superheater header arrangement will vary with the specific application. In part, the design considerations include the gas pass roof construction and the support system selected.

The preferred superheater 112 has the surface array or stage arrangement shown in FIG. 5. It will be understood that the view of pendant 112d of the superheater 112 in FIG. 2 shows a simplified schematic side elevational view of each of the pendants. The preferred form of the superheater 112 will be better understood by reference to the top view thereof in FIG. 5.

The fluid flow sequence within the superheater 112 is: supply line 130, first superheater inlet header 131, first surface array or stage 132, first superheater outlet header/ second superheater inlet header 133, second surface array or stage 134, second superheater outlet header 135, link 136 to desuperheater (not shown), link 137 from desuperheater (not shown), third superheater inlet header 138, third superheater 139, third superheater outlet header/fourth superheater inlet header 140, fourth surface array or stage 141, and superheater outlet link 143. Header division plates are indicated by numerals 144, 144.

The elongated pendants of the individual superheaters 132, 134, 141, 139 have a natural tendency to bow due to the differences in mean metal temperatures of their legs. The apparatus of the present invention, at least in some embodiments, incorporate metals with different expansion coefficients to counter this effect. For example, by varying the amount of chromium the coefficient of thermal expansion will vary and thus it is possible to avoid bowing that would ordinarily occur with a structure having two legs are exposed to different temperatures. The placement of cavities 155 at the bottom of each panel aids in reducing stress in the panel.

The elongated pendants or panels 112d of the superheater 112 have a tendency to swing like a pendulum. The placement of the cavity 155 at the bottom of each panel 112d aids in reducing swinging of the panel. More specifically, the cavity 155 is formed by the "looping" of the individual pipes in the panel 112. An alternate embodiment has a single loop (a hairpin shaped construction), rather than the double loop construction shown in FIG. 2. The single loop construction minimizes expansion effects, but increases stress. Even with the double loop construction, it is necessary to allow an end spacing at the gas lanes between (a) the division wall 110 and the pendant 112d and (b) the rear wall and the pendant. This creates an increased gap which may result in gas bypassing wherein gas is directed intermediate the wall 117 and the panel. Baffles (not shown) are employed in some embodiments to prevent this effect.

The support of the gas pass 104 walls and the superheater system will vary with the specific application. The preferred embodiment includes hanger rods 162 from a pressure part support structure 163 that extends laterally within the vessel 101. All superheater surfaces not located in the gas pass 104 and non-cooled bounding surfaces of the gas pass 104 are insulated to reduce the heat flow to the pressure vessel 101. This allows for a minimum design temperature for the pressure vessel 101.

The space intermediate the waterwalls 116, 117, 118, 118 and the pressure vessel 101 is referred to as the annulus area. The annulus area is isolated from the gas pass 104. The pressure of this area in relation to the gas pass 104 pressure is maintained by an annulus steam feed and bleed system. (not shown)

The apparatus of the present design incorporates many features to facilitate maintenance and retrofit installations. The pendants or panels of the superheater 112 are constructed to allow removal individually or as an entire module. If it is desired to remove an entire module this may be achieved cutting the pendant 112d inlet and outlet terminal tubes 112a, 112b above the upflow duct roof 114 and removing the rear wall coutant section at section C. By making a circumferential cut at D extending completely around the shell 101, the pressure shell lower head or axial extremity may be removed and the entire module can be lowered out of the shell 101.

Individual sections of each pendant 112d may be removed or repaired within the gas pass 104 without cutting of the pressure vessel 101. More specifically, this may be accomplished by gaining access thru the upflow duct roof 114 to the cavity 157. Depending on the location of the pendant 112d, tube cuts may be made below or above the roof 114 elevation. More specifically, the inlet and outlet headers each have three tubes extending therefrom to the pendant. It is these three tubes (in the preferred embodiment having an intermesh of three) that are cut to perform maintenance and are welded again after the maintenance is complete.

The return bend of the pendant 112d located above and adjacent to the cavity 156 has the tubing configured for cooperation with known orbital welding apparatus and therefore a cut may be made and rewelded at this location without requiring access to the back side of the tubing. This allows for the double loop pendant 112d to be separated into half sections. Each such half section will be half as wide and as long as the pendent. Each of such half section of pendant 112d may be lowered thru a door 190 located in the return bend of the gas pass 104 and then thru a door 158 located in the pressure vessel 101.

It is not practical to cut the vessel 101 to perform maintenance within that vessel. Although that is not practical additional room may be made available in the upflow duct 108 by removing either sections of or most of the division wall 110. Access to the division wall may be achieved by a worker crawling into the downflow duct 106 and then cutting 5 the division wall 110. For example, the division wall may be cut at locations A and B to maximize the room available for servicing pendants.

If the up flow duct 108 contains a panel type surface then this surface may have to be removed. The apparatus of the present invention enable relatively easy maintenance because the apparatus may be reassembled by using either conventional welding procedures or orbital welding. The downflow duct 106 acts as can also be considered a service area for the pendants as well as a heat absorbing section.

Figure 4:
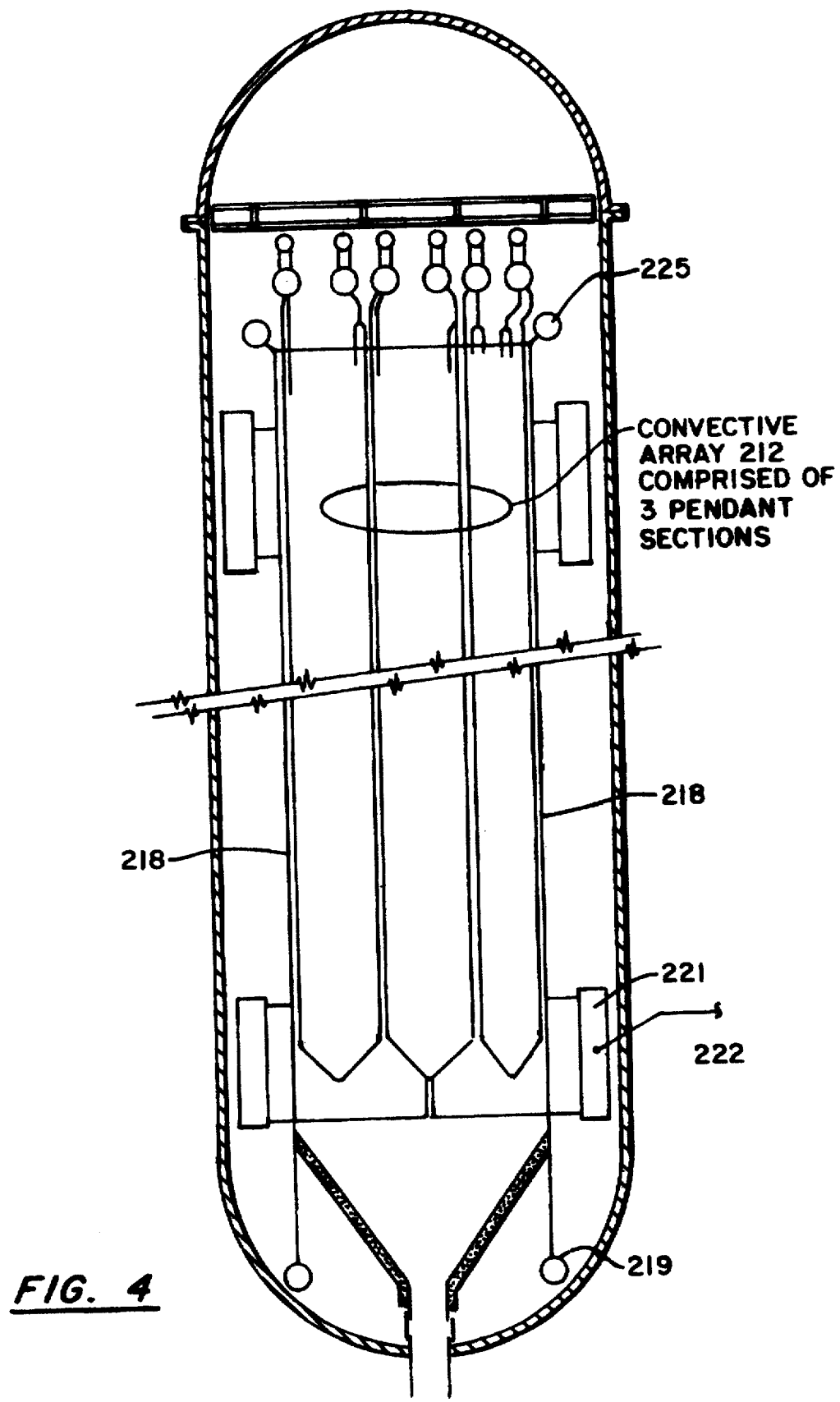
FIG. 4 is partly schematic longitudinal section taken along a plane perpendicular to the view of FIG. 3.

The apparatus in accordance with the present invention is not limited to the two pass arrangement illustrated in FIG. 2 and 5. FIGS. 3 and 4 illustrate a triple pass embodiment. This embodiment includes a pressure vessel 201 having inlet nozzle 202 and an outlet nozzle 213. Defined therein is a water cooled gas pass 204 with which includes a first downflow channel or duct 206, an upflow channel or duct 208A, and a second downflow channel or duct 208C. The first downflow channel or duct 206 and the upflow channel or duct 208A are separated by a gas pass division wall 210A and a gas pass return bend 207. Similarly, the upflow channel or duct 208A and the second downflow channel or duct 208C are separated by gas pass division wall 210B and a gas pass return bend 208B. The gas pass 206 is provided with a gas pass inlet nozzle 205 and a gas pass outlet nozzle 209. A heat exchange surface, similar to surface 111 in FIG. 2 may be disposed in the first downflow channel or duct 206 in some embodiments FIGS. 4 and 5 omit such structure to improve drawing clarity. Similarly, a heat exchange surface, similar to pendant 112d in FIG. 2 may be disposed in the second downflow channel or duct 208C in some embodiments. FIGS. 4 and 5 omit such structure to improve drawing clarity. In addition, other heat exchange surfaces may be disposed in the upflow channel or duct 208A. The roof tubing of the upflow channel or duct 208A and the second downflow channel or duct 208C is identified by reference numeral 214. A bellows 215 attaches the water cooled gas pass nozzle to outlet 213 of the pressure vessel 201. Each of the channels 206, 208A, and 208C is defined, in part by a front wall 216. The second downflow duct 208C is defined, in part by a rear wall 217.

Two sidewalls 218 partially define the a first downflow channel or duct 206, an upflow channel or duct 208A, and a second downflow channel or duct 208C. A lower ring header 219 distributes water to all of the gas pass walls. The inlet supply link to lower ring header is identified by the numeral 220 and the supply headers for division walls 210A and 210B is identified by the numeral 221. An inlet supply link to the division wall inlet headers is identified by the numeral 222. The apparatus also includes an upper ring header 225 to which all gas pass walls relieve. Roof tubing 226 covers the top of the first downflow channel or duct 206. Riser or relief tubes 228 extend from the upper ring header 225.

The apparatus also includes a cross over pressure vessel 260 in which is disposed a crossover water cooled gas pass 261 and an access door 290 for access into the into first downflow channel or duct 206.

The embodiment of FIG. 4 has cut corners (not shown), on the outer perimeter gas pass walls. In other words the array defining the gas pass 104 includes front wall 104, rear wall 217, and sidewalls 218, 218. These walls are disposed in a rectangle when viewed from the top except that the corners are beveled off so that the walls will fit within the cylindrical pressure vessel 201. This allows for a better use of the internal volume of the expensive pressure vessel 201. In general, the structure of the three pass design is similar to the two pass embodiment. The three pass or triple pass arrangement is advantageous to increase gas velocity and reduce amount of surface required for a given thermal load. The gas velocity is inherently increased over the two pass embodiment in the same pressure vessel because the passage must be smaller and thus the same volume of gas must move faster to have the same mass of gas pass through the gas pass 204. The higher velocity produces better heat transfer and thus less surface area is required for a given thermal load.

However, this is achieved at the expense of mechanical complexity and a gas outlet located at the bottom. The present invention may be constructed in a variety of forms. For example, in another form of the present invention a first pass may be configured for permitting service including inspection and possible repair of the of the second pass and to provide space for future installation of a heat transfer surface. The use of panel type heat exchange surfaces with a relatively wide spacing between them. If the gas temperature is sufficiently low to avoid fouling problems, then a tightly spaced pendant 112d arrangement may be placed in upflow duct 108. Those skilled in the art will recognize that more fouling occurs at higher temperature and that the temperatures are highest at the inlet 105. If required to get a tightly spaced pendant bifurcating may be used. When bifurcation is employed two circuits may be fed or relieved by a single circuit. A single tube in such embodiments connects a pair of tubes to a header. Therefore, up to twice as many circuits may be fed and relieved from an inlet and outlet header.

The apparatus in accordance with the invention is not limited to one having a superheater bundle in the last gas pass. If a low exit gas temperature is desired an evaporative or economizer bundle may also be located in this pass. If gas temperatures are sufficiently low, the related headers may also be located in the downflow duct 106. If, for a specific application reheat is required, a reheat pendant can be located in an appropriate pass.

As technology develops for high temperature particulate separation and feed systems the first pass may include a high temperature solids separator. Solids removal in the first pass will permit closer spacing of the heat exchange surfaces and thus permit a more compact array of downstream surfaces.

This heat exchanger arrangement in accordance with the present invention provides a number of advantages in initial cost, operation, retrofit, and maintenance when compared to traditional syngas cooler arrangements having a single down or up flow gas pass with horizontal convective surfaces.

Within each pass there may be disposed a waterwall panel or superheater pendant type surface. The structure in accordance with the preferred embodiment of the invention includes provisions for bundle maintenance. Ordinarily the syngas temperature leaving the last gas pass will be cool enough so that the waterwalls can be joined to the pressure shell with a conventional joint. In other words water cooling will ordinarily not be required for any such flexible connection.

The bundles are so configured that individual assemblies can be maintained within the gas pass that is within the pressure vessel. Assemblies can be cut and removed thru the access openings located in the shell 101. In addition, a portion of the gas pass may be initially fabricated with no heat exchange surface therein. The wall which is common between the portions of the gas pass may be removed to provide further room for maintenance. The portion of the gas pass in which no heat exchange surface is disposed remains available for future installation of a heat exchange surface.

The individual superheater assemblies are so grouped within modules that with minor pressure part removal and removal of the lower head of the pressure vessel the modular assembly may be removed.

The present invention avoids the use of ineffective horizontal convective surfaces which when used in a pressurized syngas applications operate in a fouled, ineffective manner requiring frequent sootblowing. The vertical heat exchange surfaces of the present invention will operate relatively cleanly and will not require sootblowing. The net surface area requirements are approximately equal for a horizontal surface that is fouled or for a vertical surface that operates is clean. The use of vertical heat exchange surfaces allows for lower operating expenses because sootblowing is not required.

The heat exchanger in accordance with the present invention is configured with a minimum number of tube bends and maximum part of the total axial extent thereof being straight tubular sections. The heat exchange surface is configured as simple as possible and in modular form for simple manufacturing and installation.

The headers and links for the superheater bundles are located in the spherical ends of the cylindrical pressure vessel. The upper spherical section portion is referred to as the "upper head" of the pressure vessel. Because the spherical section end is the most economical way to cap the cylindrical section, the pressure vessel will ordinarily have that surface. Because the spherical surfaces are inherent in the most economical structure it is desirable to utilize that space. The apparatus of the present invention does utilize that space for the headers and links of the superheater. This location, as compared to a location adjacent to the vertical walls, optimizes the usage of a given diameter pressure vessel. When the headers and links are secured to the sidewalls, additional space between the pressure vessel and waterwalls is required for the element terminal tubes, headers and links. When located in the upper head all these components can be arranged so as not to increase the diameter of the vessel. With the headers and links located close to the both the vessel and pressure part support locations, differential movements are held to a minimum and can be easily accommodated.

Modification of the apparatus to increase capacity may be achieved by a field extension of the pressure vessel, bounding walls and a section of pendant. This approach does not require relocation of any of the inlet and outlet links and headers.

The invention has been described with reference to it's illustrated preferred embodiment. Persons skilled in the art may upon exposure to the teachings herein, conceive other variations. Such variations are deemed to be encompassed by the disclosure, the invention being delimited only by the appended claims.

Having thus described my invention I claim:

1. A syngas cooler apparatus which comprises:
   an elongated generally cylindrical pressure vessel, said pressure vessel having an axial extremity that is a top end during normal operation of said cooler and an axial extremity that is a bottom end during normal operation of said cooler,
   a support member extending laterally within said pressure vessel proximate to said top end;

front, back, and two side walls defining at least one flow channel in said pressure vessel;

said pressure vessel having an inlet and an outlet communicating with said flow channel; and a pendant heat exchanger surface comprising a plurality of loops therein, each of said loops being formed from tubing, the major portion of the entire axial extent of said tubing in any given loop, being rectilinear axial sections that are disposed with the axes thereof substantially in a vertical plane during normal operation, each of said rectilinear axial sections extending through the major part of the axial extent of said pressure vessel, said pendant heat exchanger surface being disposed in said flow channel intermediate said inlet and said outlet, said pendant heat exchanger surface being supported solely from said laterally extending support member, said cooler including a header at the top thereof, a division wall separating said flow channel into first and second portions, the direction of fluid flow in said first portion being opposite to the direction of fluid flow in said second portion, the direction of fluid flow in said first portion being downward, each of said plurality of loops each including first and second U-shaped bends defining first and second cavities.

2. The apparatus as described in claim 1 wherein:

said pressure vessel has generally spherical ends and said pendant heat exchanger surface includes headers and links and said headers and links are disposed substantially within one of said generally spherical ends.

3. The apparatus as described in claim 2 wherein:

said front, back, and two side walls are membrane walls.

4. The apparatus as described in claim 3 further including:

a second heat exchange surface disposed in said flow path.

5. A syngas cooler apparatus which comprises:

an elongated generally cylindrical pressure vessel, said pressure vessel having an axial extremity that is a top end during normal operation of said cooler and an axial extremity that is a bottom end during normal operation of said cooler, a support member extending laterally within said pressure vessel proximate to said top end;

front, back, and two side walls within said pressure vessel defining at least one flow channel in said pressure vessel, and a division wall separating said flow channel into a downflow duct and an upflow duct, each of said walls being a water wall and each of said walls extending a major part of the distance intermediate said top end and said bottom end;

said pressure vessel having an inlet and an outlet communicating with said flow channel; and a pendant heat exchanger surface comprising at least one panel, each panel including a plurality of loops, said pendant heat exchanger surface being disposed in said flow channel intermediate said inlet and said outlet, said pendant heat exchanger surface being supported solely from said laterally extending support member, said cooler including a header at the top end thereof.

6. The apparatus as described in claim 5 wherein:

each of said loops is formed from tubing, the major portion of the entire axial extent of said tubing in any given loop, being rectilinear axial sections that are disposed with the axes thereof substantially in a vertical plane during normal operation, each of said rectilinear axial sections extending through the major part of the axial extent of said pressure vessel.

7. The apparatus as described in claim 6 wherein:

each pendant heat exchanger surface includes a plurality of panels, each panel including a plurality of loops.

8. The apparatus as described in claim 7 wherein:

said loops form cavities and at least some of said cavities are disposed closer to said bottom end than said top end.

9. The apparatus as described in claim 8 wherein:

the apparatus further includes at least a third duct communicating disposed substantially parallel to said downflow duct and said upflow duct and connected for serial flow with said downflow duct and said upflow duct so that all gases in said upflow duct and said downflow duct also pass through said third duct.

10. The apparatus as described in claim 9 wherein:

said apparatus further includes a second division wall defining said third duct in said flow channel.

11. The apparatus as described in claim 10 wherein:

said apparatus further includes a pendant heat exchanger surface in said third duct.

12. The apparatus as described in claim 11 wherein: said second division wall is a waterwall.

13. The apparatus as described in claim 12 wherein:

said pendant heat exchanger surfaces are constructed of first and second materials having differing coefficients of thermal expansion.

14. The apparatus as described in claim 5 wherein:

said pendant heat exchange surface is in said upflow duct and said apparatus further includes at least one heat exchange surface extending into said downflow duct from the side thereof.

* * * * *